Patented Oct. 12, 1948

2,450,940

UNITED STATES PATENT OFFICE 2,450,940

POLYAMIDES FROM POLYMERIC FAT ACIDS

John C. Cowan, Lee Bert Falkenburg, and Howard M. Teeter, Peoria, and Philip S. Skell, Urbana, Ill., assignors to the United States of America as represented by the Secretary of Agriculture No Drawing. Application April 20, 1944, Serial No. 531,966

3 Claims. (Cl. 260—404.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to high molecular weight polymeric compounds and more particularly to polyamides of polymeric fat acids.

Natural oleaginous materials of vegetable and animal origin are essentially mixtures of glyceryl esters of various carboxylic acids known as fat acids, the term "fat acid" designating any carboxylic acid which occurs either in the free form or as an ester in fats and oils of vegetable and animal origin. It is common practice in the oil industry to impart desirable properties to oils of the glyceride type by subjecting them to heat treatments known as bodying processes. In the course of such treatments, polymerization of the oil occurs, the amount of polymerization varying with the operating conditions and with the nature of the oil.

Polymerization of oils in an inert atmosphere is due to the presence therein of certain constituents containing radicals of unsaturated acids. Fat acids, the acyl radical of which contains a plurality of double bonds, are capable of undergoing polymerization, for instance, as a result of thermal treatments, and this property is shared by their glycerides and other esters. Examples of polymerizable fat acids are octadecadienoic acids containing two double bonds, like linoleic acid, and octadecatrienoic acids containing three double bonds, such as linolenic and eleostearic acids.

Polymerization of fatty oils takes place by intermolecular condensation at the double bonds of acyl radicals of polymerizable fat acids. The reaction products thus obtained comprise dimeric and trimeric polymers formed, respectively, by the union of two or three molecules of fat acids, and also monomeric unpolymerized compounds. In addition, some products which may be classified as cracked materials are obtained. Thus, polymeric fat acid esters can be obtained from substances comprising polymerizable fat acid esters by subjecting them to a polymerization process followed by elimination of the monomeric fraction of the treated material.

Polymeric fat acids can be produced, for instance, from fatty acids containing glycerides of polymerizable fat acids, such as oils of peanut, cottonseed, wheat, soybean, corn, and linseed, tung, dehydrated castor, perilla, conjugated linseed oil, and other oils of the drying or semi-drying type.

The oil may be polymerized in the usual manner by thermal treatment. Suitable polymerization catalysts may be used. Where catalysts are used, the temperatures required for polymerization vary with the type of catalyst. The polymeric glycerides may then be isolated, for example, by distillation and converted to the polymeric fat acids by hydrolysis.

Another procedure suitable for the production of polymeric fat acids comprises subjecting a fatty oil of the aforementioned type to alcoholysis with monohydric alcohols, such as methanol and ethanol, thereby converting the glycerides of the fat acids to the corresponding monohydric alcohol esters. Then, these esters are polymerized, yielding monohydric alcohol esters of polymeric fat acids which can be segregated from the other reaction products by distillation and which can be converted to polymeric fat acids by hydrolysis.

Still another method of obtaining polymeric fat acids comprises producing the free fat acids by hydrolysis of the fatty material, polymerizing the free acids in some suitable way, and isolating the polymeric fat acids. This method is applicable to oils whose acids will polymerize without much decarboxylation of the fat acids.

The polymeric fat acid obtained by any of the foregoing procedures consists primarily of dibasic dimeric fat acids, having an average molecular weight of about 560, admixed with trimeric tribasic fat acid, the average molecular weight of which is approximately 840.

We have discovered that high molecular weight polymeric products can be obtained by reacting polyamines with polymeric fat acids or with amide-forming derivatives of fat acids. The amide-forming derivatives of polymeric fat acids are their esters, anhydrides, and acyl halides.

The products of this invention are polyamides of polymeric fat acids. They have a molecular weight of about 3,000 to 5,000. These polyamides are substances possessing valuable properties which render them useful as components or as intermediates in the manufacture of adhesives, resins, plastics, coating compositions, plasticizers, and other synthetic materials.

The products of this invention are obtained, for example, by heating, preferably equimolecular amounts (although an excess of either reactant may also be used), of a polyamine with polymeric fat acids, or with an amide-forming derivative of polymeric fat acids.

It is to be understood that this invention is applicable to polymeric fat acids obtained by polymerization of fatty oils, or of various fractions or derivatives thereof, such as the dimeric or mixed dimeric and trimeric fat acids and their amide-forming derivatives.

Satisfactory results are obtained by reacting, for example, polyamines with esters of polymeric fat acids, such as, their methyl or ethyl esters.

The products of this invention are obtained by reacting the polymeric fat acids with polyamines in approximately equivalent amounts. These amounts may be calculated from titration of the starting materials for their acidity and basicity. The reaction is effected by heating the materials at such a temperature that polyaminolysis of the fat esters or the dehydration of the polyamine salts of the fat acids will occur readily. Temperatures of 150–175° C. for a few hours with 175–225° C. for 20–40 minutes just prior to removal of polyamide from the reaction chamber are sufficient. The time and temperature will vary depending on materials used and type of product desired. Lower temperatures of 100–125° C. are used if all the polyamine is added at the start of the reaction since higher temperatures can cause foaming. In addition, polyamides can be obtained with mixtures of polymeric fat acids with other dibasic acids such as sebacic, adipic, terephthalic, and fumaric acids.

Suitable polyamines are aliphatic primary and secondary amines containing at least two amino groups. Polyamines which yield satisfactory results are, for example, ethylene diamine, diethylene triamine, triethylene tetramine, and hexamethylene diamine, tetraethylene pentamine, the diamine obtained by hydrogenation of the nitriles from polymeric fat acids, and the like.

Foaming may become objectionable with certain polyamines, but if the polyamine is added slowly with stirring to hot polymeric fat acids, foaming is greatly diminished. Formation of salt linkages and dehydration to amide linkages evidently proceeds rapidly enough so that no excess of amine salt is obtained. Since the amine salts are apparently responsible for the foaming, the foaming is reduced to a minimum merely by controlling the rate of addition of polyamine.

The reaction is usually carried out at atmospheric pressure, although toward the end of the reaction it is advantageous to operate in vacuum. This procedure aids in effecting removal of reaction products and therefore in driving the reaction toward completion. If desired, the condensation may be effected in the presence of suitable solvents or dispersing media, provided such media do not interact to any appreciable extent with the other components of the mixture and have boiling points sufficiently high to allow the temperature to be maintained at the desired level.

The operating temperature and time of reaction vary, depending on the nature of the starting materials and the properties desired in the final products.

One factor which necessitates differences in operating procedure is the physical properties of the polyamine added. Ethylene and hexamethylene diamine are somewhat volatile and if proper precautions are not observed, some of the amine may not react before it distills out of the reaction mixture. This loss of amines occurs most readily when polymeric fat acid esters are used rather than the acids. Whenever a relatively low boiling reactant is used, for example, ethylene diamine, the loss of this reactant can be controlled by operating under partial reflux so that the more volatile products such as water or alcohol can escape but the diamine can be retained. The passage of the distillate through a fractionating tower and returning the less volatile material to the reaction chamber also aids in reducing the loss of diamine. With the higher boiling polyamines such as diethylene triamine, the diamine can be added directly to the acid or ester at temperatures sufficient to cause polyamide formation without any loss of polyamine. The loss of appreciable polyamine or the use of less than an equivalent quantity in the reaction will produce an acidic polymer, whereas, the use of excess polyamine will give a basic polymer.

In addition, if a large excess or deficiency of polyamine is used a very low molecular weight polymer would be obtained. The molecular weight at any specific degree of reaction can be varied by use of different excesses of polyamine or polymeric fat acids. With any preparation, the reaction can be stopped at a desired degree of reaction by following the basic or acidic neutral equivalent or the viscosity in a suitable solvent, or the gelation time on a hot plate. When the desired degree of reaction is obtained, the reaction product is immediately run into containers.

These methods of varying procedure can produce different types of products. For example, samples of the ethylene diamine polyamide can be obtained in the same run which have melting point ranges starting at 70° C. to 110° C. The same result in melting characteristic can be achieved by use of excess of one reagent but the polyamide will then be either a basic or acidic polymer depending on which material is used in excess. In general, the melting point of the polyamide goes down as the higher members of a series are used. For example, ethylene diamine polyamide melts higher than hexamethylene diamine polyamide or diethylene triamine polyamide.

The melting point of the polyamide interpolymers from mixtures of polymeric fat acids and another dibasic acid, such as sebacic acid, are higher than the polyamide from polymeric fat acids. This behavior is unusual since polyamides interpolymers obtained from some mixtures of dibasic acid may be lower melting than either of the polyamides obtained from the pure dibasic acid. With dibasic acids, such as sebacic and adipic acid, a minimum is usually encountered when the melting points of the polyamide interpolymers are plotted against dibasic acid composition. This is not so with mixtures of residual dimeric fat acids and most dibasic acids. For example, polyamide interpolymers from sebacic and residual dimeric fat acids with ethylene diamine melts at 108° to 112° C. with 0 percent sebacic, 122° to 129° C. with 12.5 mol percent sebacic, 146° to 155° C. with 25 mol percent sebacic, and 188° to 196° C. with 50 mol percent sebacic.

The hardness of the films of these polyamides varies with the melting point ranges of the material, i. e., a polymer having a high melting point range is harder than one with a low melting point range. Also, the tackiness of the films from these polyamides varies in a similar manner. For example, the ethylene diamine polyamide with residual dimeric fat acids gives a hard film which becomes almost free from tack in a relatively short period, but the triethylene tetramine polyamide gives a tacky film which is pressure sensitive.

The solubility of these polyamides varies with the nature of the reactants used and the degree of reaction of the polymeric condensation. If the reaction is carried too far the polyamides are infusible and insoluble. The polyamides obtained when polymeric fat acids are condensed with polyamines are soluble in electron acceptor solvents, such as chloroform, alcohols, amines, and organic acids. Aromatic hydrocarbons are excellent secondary solvents with high dilution ratios while petroleum hydrocarbons have sufficiently high dilution ratio to be useful as diluents. Esters, ethers and some ketones are not primary solvents and in most cases are poor secondary solvents. The polyamides from a mixture of a dibasic acid, such as sebacic and polymeric fat acids, are not as soluble as the polyamides prepared not using other dibasic acid. For example, the polyamide from a mixture of sebacic and residual dimeric fat acids is less soluble in butanol than a polyamide from polymeric fat acids.

The polyamide of sebacic acid-residual dimeric fat acids with ethylene diamine is useful for coating wire exposed to temperatures up to 140–180° C. with good flexibility under most operating conditions. The temperatures which this copolymer will withstand without failure depend on the proportion of sebacic acid used.

The triethylene tetramine polyamide of polymeric fat acids as well as the diethylene diamine and the tetraethylene pentamine polyamides are suitable resinous materials for use for pressure-sensitive adhesives.

The diamines obtained by hydrogenation of the polymeric fat acid nitriles when reacted with residual dimeric fat acids give a polyamide which is a suitable base for a rubber substitute with good low temperature characteristics. The diethylene and triethylene polyamides are also useful as rubber substitutes but do not have good low temperature characteristics.

The following examples will further illustrate this invention and the manner in which it may be practiced:

*Example 1*

A mixture of 1,094 gm. of polymeric fat acids derived from soybean oil (dimer-trimer ratio of 1.7 on a mol basis) and 154.8 gms. of 70 percent ethylene diamine (equivalent amount) was heated in a reaction vessel under an inert atmosphere for 2 hours at 130–140° C. The temperature was then slowly raised over a period of 2 hours to 202° C. The reaction product was a clear amber colored, hard, brittle, non-tacky resin, melting in a range of 96 to 103° C., and was soluble in butyl alcohol, isopropyl alcohol, and mixtures of these alcohols with hydrocarbons.

*Example 2*

This example illustrates the effect of an excess of amine on the final product. A mixture of 1,050 gms. of polymeric fat acids derived from soybean oil (dimer-trimer ratio of 1.7) and 186.1 gms. of 70 percent ethylene diamine (.2 mole excess) was treated under the conditions given in Example 1. The reaction product differed from that of Example 1 in that it was softer, melted in a range of 85–92° C., and was more soluble.

*Example 3*

In an electrically heated kettle (15 gal. capacity), fitted with stirrer, inlet tubes for nitrogen gas and diamine, and thermometer, 15.82 kg. of polymeric fat acids derived from soybean oil (dimer-trimer ratio of 1.8) were heated to 150° C. To the hot acids, 2.3 kg. of 70 percent aqueous ethylene diamine was slowly added. The addition of diamine and the temperature of the reaction mixture were controlled so that the removal of water was effected without any objectionable foaming. The reaction product was similar to that of Example 1, except that it melted in a range of 108 to 112° C. Its excellent resistance to water, acid, and alkali, besides its other properties, make it especially suited for use as a lacquer or spirit varnish.

*Example 4*

To demonstrate that practically identical polymers may be prepared from either the residual dimerized fat acids or from the esters, the following example is given. A mixture of 552 gm. (.8 mole) of methyl esters of polymeric fat acids derived from soybean oil (dimer-trimer ratio of 1.7) and 97 gm. (1.0 mole) of ethylene diamine was heated in a reaction vessel fitted with a fractionating column which allowed for the removal of water and methanol, but which returned the ethylene diamine which tended to distill, for 3 hours at 110–160° C., and for 2 hours at 190–230° C. During the latter stages of reaction, the system was placed under a vacuum of 15–20 mm. Hg. The reaction product was a light-colored, hard, brittle resin, melting in the range of 86–92° C.

*Example 5*

Fourteen and one-tenth pounds of methyl esters of polymeric fat acids derived from linseed oil and 1 3/16 pounds of 70 percent aqueous ethylene diamine were heated in an electrically heated kettle, fitted with a small column, at 110–150° C. for 2½ hours, and then at a temperature of 180–220° C. for an additional hour and a half. For the last 50 minutes of the reaction, a reduced pressure of 12 millimeters of mercury was maintained. The reaction product was a hard, brittle resin, melting in the range of 96–105° C. and was soluble in butanol.

*Example 6*

To 326 gm. of methyl esters of polymeric fat acids derived from dehydrated castor oil was added 48.9 gm. of ethylene diamine (70 percent). This mixture was heated for 2 hours at 106–135° C., and then for 2 hours at 164–190° C. The system was placed under a reduced pressure of 20 mm. for the last half hour. The reaction product was a light brown, hard, brittle resin, melting in the range of 96–100° C.

*Example 7*

To 96.5 gm. of methyl esters of polymeric fat acids derived from tung oil was added 14.5 gm. of 70 per cent aqueous ethylene diamine. This mixture was heated together in a reaction vessel at 106–140° C. for 1¾ hours, and at 140–210° C. for 2 hours. The system was placed under 20 mm. Hg vacuum during the last 10 minutes of the reaction. The reaction product was a hard, brittle resin, melting in the range of 90–96° C.

*Example 8*

To 250 gm. of polymeric fat acids derived from soybean oil was added 23.9 gm. of hydrazine hydrate. The mixture was heated in a reaction vessel at 110–160° C. for 2½ hours, and for one hour at 180–190° C. The reaction product was a hard, brittle resin, similar to that obtained in Example 1.

*Example 9*

To 507 gms. of polymeric fat acid derived from soybean oil was added 75.5 gms. of 85 percent propylenediamine. The mixture was heated in a reaction vessel at 150–204° C. for 2½ hours. The reaction product was a medium, hard, tacky resin, melting in the range of 53–59° C.

*Example 10*

A mixture of 16.9 gm. of residual dimerized fat acids and 18.9 gm. of the polybasic amine formed by conversion, by means of well-known methods, of the carboxyl groups (—COOH) of residual dimerized fat acids to amino methyl groups (—CH$_2$NH$_2$), was heated under an atmosphere of nitrogen for 3 hours at 200° C. and for an additional 2 hours at 250° C. The reaction product was a tough, pliable, tacky resin which showed no definite melting point and which was not brittle at 0° C. It was soluble in butanol and could be milled on conventional rolls.

*Example 11*

A mixture of 570 gm. of polymeric fat acids derived from soybean oil and 108 gm. of diethylene triamine was heated in a reaction vessel for 2 hours at 130–140° C. under an inert atmosphere. The temperature was then raised to 201° C. over a period of 2 hours. The reaction product was a soft, tacky resin which melted in the range of 50 to 56° C. It was soluble in butyl alcohol.

*Example 12*

A mixture of 297.5 gm. of polymeric fat acids derived from soybean oil and 104 gm. of tetraethylene pentamine was heated in a reaction vessel for 1 hour at 130–140° C., and then at 140–165° C. for 1¼ hours. The reaction product was a soft, tacky resin which melted in the range of 45–51° C.

*Example 13*

A mixture of 500 gm. of polymeric fat acids from soybean oil and 109 gm. of hexamethylene diamine was heated in a reaction vessel at 130–140° C. for 1¾ hours, and then at 140–208° C. for 3 hours. The reaction product was a soft, non-tacky resin which melted in a range from 70–80° C.

*Example 14*

A mixture of 560 gm. of polymeric fat acids from soybean oil and 30 gm. of ethylene diamine and 51.5 gm. of diethylene triamine was heated for 3 hours at 130–140° C., and then for 3¾ hours at 140–205° C. The reaction product was a soft, tough, non-tacky resin, melting in the range of 65–75° C.

*Example 15*

To 280 gm. of polymeric fat acids derived from soybean oil was added 29 gm. of hexamethylene diamine and 25.8 gm. of diethylene triamine, and the mixture was heated for 2½ hours at 130–140° C. The temperature was then raised to 207° C. over a period of 4 hours. The reaction product was a hard, non-tacky resin. Its melting range was from 60–70° C.

*Example 16*

To a mixture of 500 gms. of polymeric fat acids from soybean oil and 42.8 gms. of sebacic acid was added 91 gms. of 70 percent ethylene diamine, and the mixture was heated for 1 hour at 150–170° C. and then for 1½ hours at 190–208° C. The reaction product was a hard, non-tacky, resin melting in the range of 146–155° C. and was soluble in mixtures of butyl alcohol and benzene.

*Example 17*

To a mixture of 502 gms. of polymeric fat acids derived from soybean oil and 24.6 gms. of maleic acid was added 63.7 gms. of anhydrous ethylenediamine. The mixture was then heated for 2 hours at 150–280° C. under nitrogen. The reaction product was a hard, non-tacky resin melting in the range of 118–126° C.

*Example 18*

To 500 gms. of polymeric fat acids derived from soybean oil and 85.6 gms. of sebacic acid was added 109 gms. of 70 percent ethylene diamine. This mixture was heated for 2 hours at 151–215° C. under an atmosphere of nitrogen. The reaction product was a very hard, brittle, non-tacky resin melting in the range of 164–175° C.

*Example 19*

To 450 gms. of polymeric fat acids derived from soybean oil and 154 gms. of sebacic acid was added 130.8 gms. of 70 percent ethylene diamine. This mixture was heated 1 hour at a temperature of 150–190° C. and then an additional hour at 230–240° C. The reaction product was a very hard, brittle, non-tacky resin melting in the range of 188–196° C. and was insoluble in the common organic solvents.

*Example 20*

To 500 gms. of polymeric fat acids derived from soybean oil and 21.4 gms. of sebacic acid was added 57.3 gms. of ethylene diamine. The mixture was heated for 3 hours at 150–223° C. The reaction product was a hard, brittle resin having a melting range of 122–129° C.

*Example 21*

To 522.7 gms. of polymeric fat acids derived from soybean oil and 30.1 gms. of sebacic acid was added 62.7 gms. of ethylene diamine. The mixture was heated for 3½ hours at 150–225° C. The reaction product was a hard, brittle resin melting in the range of 130–135° C.

Having thus described our invention, we claim:

1. A process of preparing a hard, fusible, polyamide resin soluble in butyl alcohol and insoluble in ethers, esters, and ketones, and having a molecular weight within the range 3,000 to 5,000, and a melting point no lower than 70° C., comprising heating a polymeric substance of the group consisting of polymerized polyene fatty acids, and the esters and anhydrides thereof, with an equivalent amount of ethylene diamine, the temperature of the reaction being maintained initially at no higher than 160° C for at least one hour, and thereafter raising the temperature to within the range 175°–225° C. and maintaining it there for a time sufficient to form the said hard, fusible, polyamide.

2. The process described in claim 1, in which the polymeric substance is the free acid.

3. A hard, fusible, polyamide resin characterized by being hard at room temperatures and having a molecular weight within the range 3,000 to 5,000, and a melting point no lower than 85° C., and which is further characterized by insolubility in ester, ether, and ketone lacquer solvents and by solubility in butyl alcohol, said resin being prepared by the process of claim 1.

JOHN C. COWAN.
LEE BERT FALKENBURG.
HOWARD M. TEETER.
PHILIP S. SKELL.

REFERENCES CITED

The following references are of record in the file of this patent:

UNITED STATES PATENTS

| Number | Name | Date |
|---|---|---|
| 2,176,702 | DeGroote | Oct. 17, 1939 |
| 2,194,643 | DeGroote | Mar. 26, 1940 |
| 2,353,710 | DeGroote | July 18, 1944 |
| 2,379,413 | Bradley | July 3, 1945 |

OTHER REFERENCES

Bradley et al., Jr. Ind. & Eng. Chem., vol. 33, No. 1, Jan. 1941, pages 86-89.